United States Patent [19]
Saito

[11] Patent Number: 5,528,575
[45] Date of Patent: Jun. 18, 1996

[54] OPTICAL PICKUP APPARATUS FOR A MAGNETO-OPTICAL RECORDING MEDIUM

[75] Inventor: Kimihiro Saito, Saitama, Japan

[73] Assignee: Sony Corporation, Japan

[21] Appl. No.: 281,242

[22] Filed: Jul. 27, 1994

[30] Foreign Application Priority Data

Aug. 6, 1993 [JP] Japan .................... 5-195014

[51] Int. Cl.$^6$ .................................. G11B 7/00
[52] U.S. Cl. .................. 369/110; 369/112; 369/44.23
[58] Field of Search ...................... 369/109, 110, 369/112, 116, 44.23, 120; 359/280

[56] References Cited

U.S. PATENT DOCUMENTS

| | | | |
|---|---|---|---|
| 4,721,368 | 1/1988 | Deguchi et al. | 369/110 |
| 4,771,414 | 9/1988 | Yoshimatsu | 369/110 |
| 4,858,218 | 8/1989 | Takagi et al. | 369/109 |
| 5,004,326 | 4/1991 | Sasaki | 369/110 |
| 5,097,462 | 3/1992 | Fujita et al. | 369/109 |
| 5,124,868 | 6/1992 | Matsubayashi et al. | 369/110 |
| 5,189,655 | 2/1993 | Ogata et al. | 369/44.23 |
| 5,216,562 | 6/1993 | Luecker et al. | 359/280 |
| 5,251,198 | 10/1993 | Strickler | 369/110 |

FOREIGN PATENT DOCUMENTS

| | | |
|---|---|---|
| 0537787A3 | 4/1993 | European Pat. Off. . |
| A-05166239 | 1/1986 | Japan . |
| A-03263636 | 11/1991 | Japan . |
| A-05166239 | 7/1993 | Japan . |

Primary Examiner—Loha Ben
Attorney, Agent, or Firm—Limbach & Limbach; Charles P. Sammut

[57] ABSTRACT

An optical pickup apparatus for a magneto-optical recording medium on which a wobbling track is formed includes a light source, an objective lens and a polarization beam splitter. The light source emits a linearly polarized diverging light beam. The objective lens converges the light beam emitted by the light source onto a magneto-optical recording medium and converges light reflected from the magneto-optical recording medium. The polarization beam splitter is disposed in a divergent/convergent light path between the light source and the objective lens and separates the reflected light beam from the magneto-optical recording medium from the divergent/convergent light path. The light source is disposed so that the plane of polarization of the light beam emitted by the light source is normal to the track of the magneto-optical recording medium. The polarization beam splitter is disposed so that the plane which includes the component of the reflected light beam from the magneto-optical recording medium corresponding to the component of the light beam emitted by the light source which is on the optical axis and also includes the component of the light separated from the divergent/convergent light path which is said reflected light beam component separated from the divergent/convergent light path is normal to the track of the magneto-optical recording medium.

16 Claims, 16 Drawing Sheets

FIG. 3
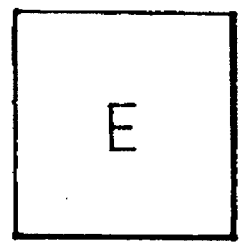
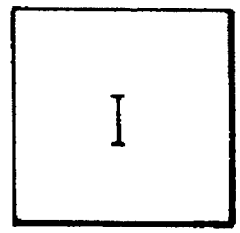
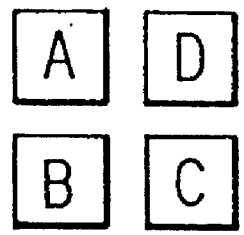
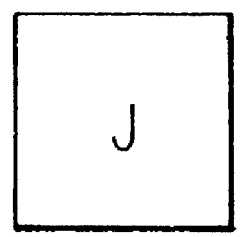
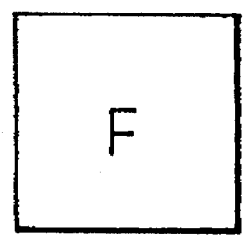

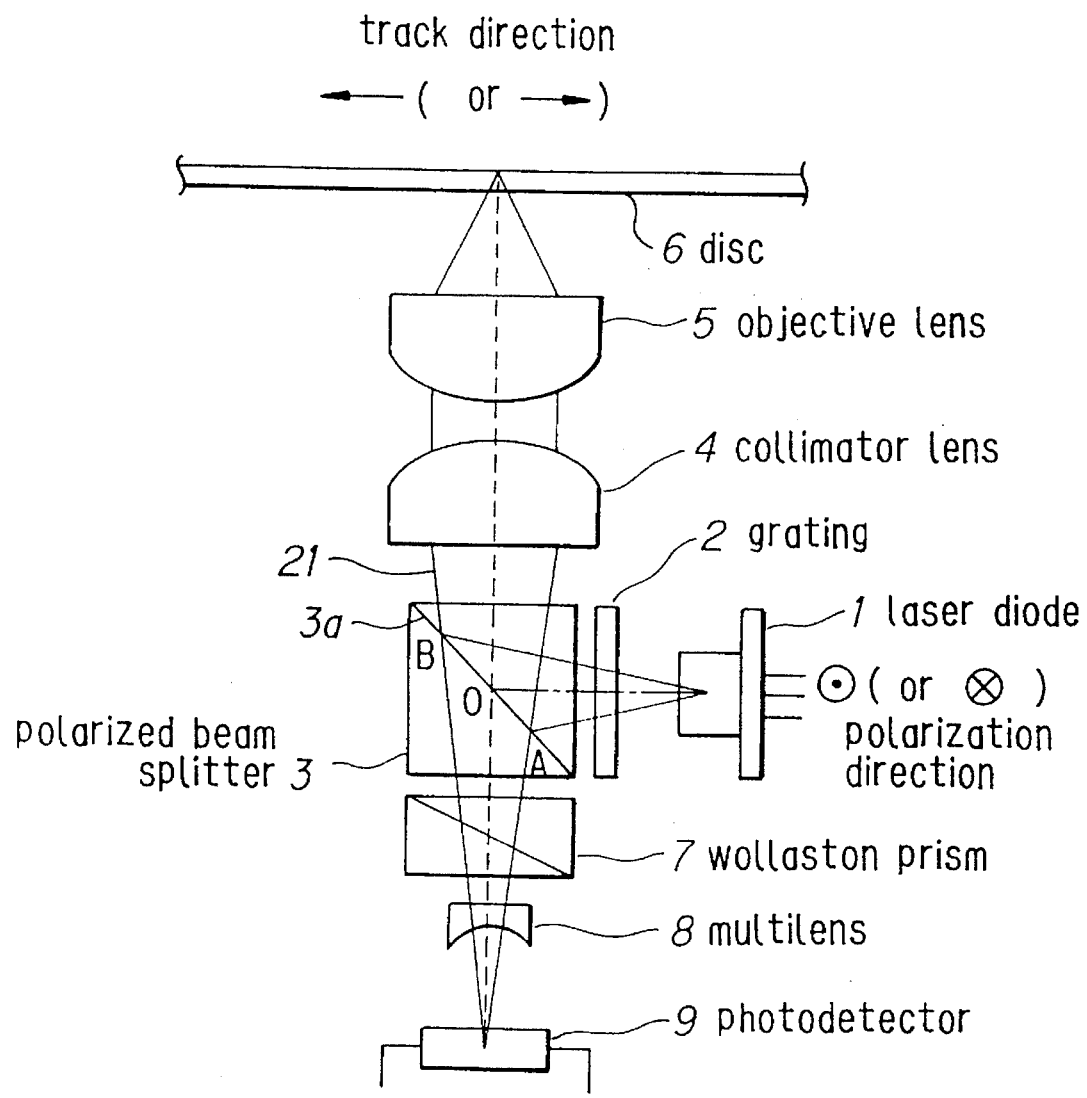

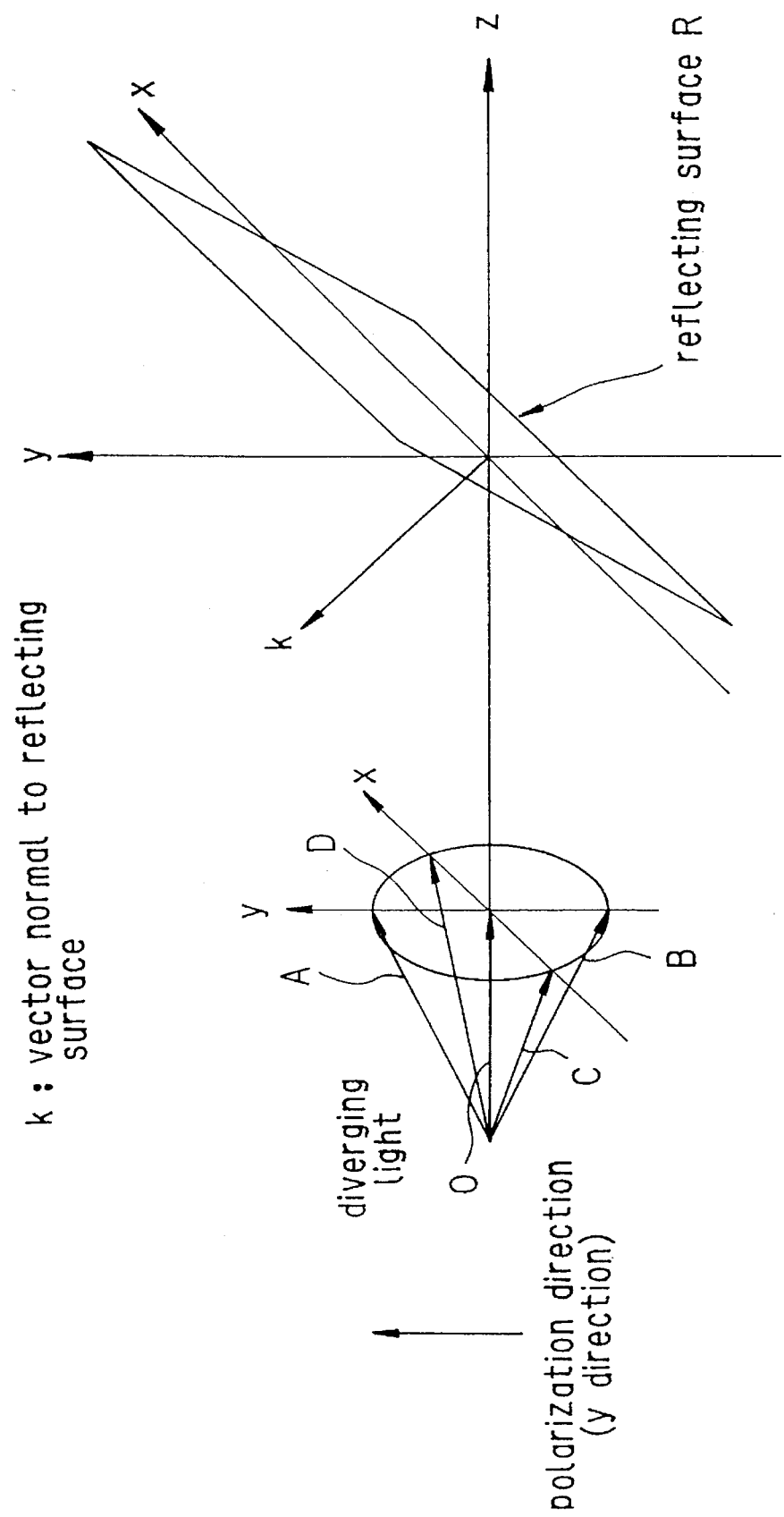

FIG.16A S-split type
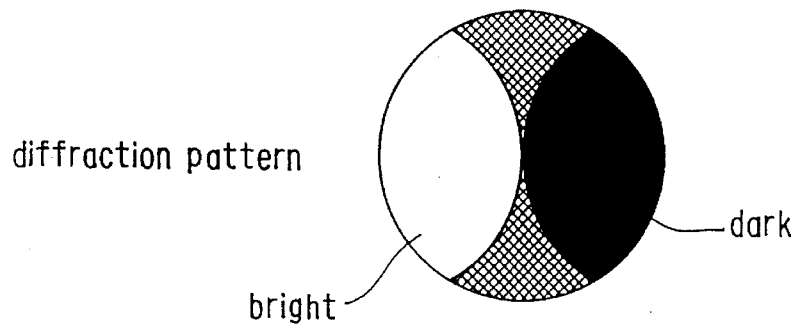
diffraction pattern
FIG.16B
rotation of polarization caused by polarized beam splitter
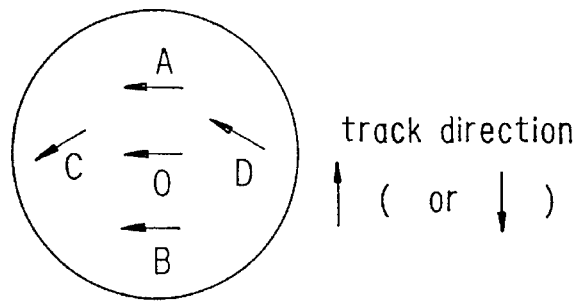
track direction
FIG.16C
state of polarization
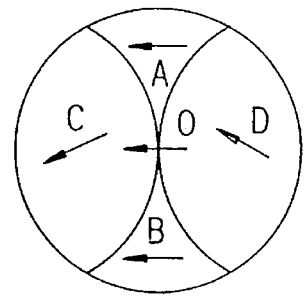

track direction

| ( or | )

P-split type diffraction pattern bright — dark rotation of polarization
caused by polarized
beam splitter track direction ↑ ( or ↓ )

state of polarization

OPTICAL PICKUP APPARATUS FOR A MAGNETO-OPTICAL RECORDING MEDIUM

BACKGROUND

1. Field of the Invention

This invention relates to an optical pickup for a magneto-optical recording medium, and particularly to an optical pickup for a magneto-optical recording medium having wobbling tracks.

2. Background of the Invention

Information is recorded on a magneto-optical recording medium such as, for example, a magneto-optical disc by the Curie point recording method wherein the recording layer of the magneto-optical recording medium is magnetized perpendicularly in corresponding to the information being recorded. In the Curie point recording method, information is recorded on a magneto-optical recording medium by applying to a magnetic field perpendicular to the magneto-optical recording medium while heating the magneto-optical recording medium to above the Curie temperature with a light beam.

Information recorded on a magneto-optical disc serving as a magneto-optical recording medium is reproduced in the way shown in FIG. 1.

That is, a linearly polarized light beam emitted by for example, a laser diode 200 is reflected by the reflecting surface of a polarization beam splitter (PBS) 201 and enters an objective lens 202. This light beam is then converged by an objective lens 202 onto a magneto-optical disc D and is reflected. At this time, due to the so-called magnetic Kerr effect, the plane of polarization of the light beam is rotated to the right or to the left (by an angle $\theta_k$ or $-\theta_k$), according to the direction of the magnetization of the magneto-optical disc D.

The reflected light beam from the disc D, whose plane of polarization has been rotated through for example $\theta_k$ by this magnetic Kerr effect, passes through the objective lens 202, enters and is transmitted through the PBS 201. At this time the rotation angle of the plane of polarization of the reflected light beam from the disc D is amplified by the polarization characteristics of the PBS 201.

That is, considering two orthogonal polarization components (which here will be called the x, y polarization components), and supposing that the PBS 201 has polarization characteristics such that the transmittance Tx of the x polarization component is 1 (=100%) and the transmittance Ty of the y polarization component is a predetermined value less than 1, as shown in FIG. 1, the light beam being transmitted through the PBS 201 causes the y polarization component only, of the polarization components, to be multiplied by Ty (<1.0) and become smaller. As a result, as shown in FIG. 1, the rotation angle of the plane of polarization is amplified from $\theta_k$ to the greater $\theta'_k$.

The reflected light beam from the disc D, having been transmitted through the PBS 201, enters an analyzer 203 comprising for example a Wollaston prism. In the analyzer 203, an i polarization component and a j polarization component are detected from the reflected light beam from the disc D. The i and j polarization components respectively are the reflected light from the disc D projected onto the i and j axes of an i–j coordinate system obtained by rotating the x–y orthogonal coordinate system expressing the x, y polarization components counterclockwise through 45°.

Here, the x and y polarization components in this specification respectively correspond to the so-called S and P polarization components.

The i and j polarization components from the analyzer 203 are directed into detectors 204a, and 204b. The detectors 204a and 204b receive the i and j polarization components from the analyzer 203 with two respective light receiving surfaces and output voltages corresponding to the amounts of light they receive as signals I, J.

Because, as discussed above, the plane of polarization of the reflected light beam from the disc D has been rotated to the right or to the left (by rotation angle $\theta_k$ or $-\theta_k$) according to the direction of the magnetization of the disc D, the magnitude relationship between signal I and signal J differs depending on this rotation direction. Consequently from this magnitude relationship it is possible to judge the magnetization direction of the disc D; that is, it is possible to reproduce the information recorded on the disc.

Accordingly, from signal I and signal J outputted from the detectors 204a and 204b, the difference ($|I|^2-|J|^2$) between the squares of their absolute values is computed as an MO signal and based on the size of this MO signal the information recorded on the disc D is reproduced.

A magneto-optical disc reproduction device which reproduces information in the way described above is shown in FIG. 2. A laser diode 1 emits a divergent light beam having a polarization direction of, for example the horizontal direction in FIG. 2. This light beam enters a collimator lens 4 which changes it into parallel light and discharges it to a grating 2. Based on this parallel light beam the grating 2 produces a main or primary beam for reproducing information recorded on a magneto-optical disc 103 and two auxiliary or secondary beams for detecting tracking error which are each a predetermined distance, for example ¼ of the track pitch of the disc 103, from the main beam in a direction orthogonal to the track and are point-symmetrical about the main beam, and directs them toward a polarization beam splitter (PBS) 101.

The one main beam and two auxiliary beams from the grating 2 are transmitted through the reflecting surface 101a of the PBS 101, enter the objective lens 5, are converged onto the disc 103 and are reflected. At this time, as explained above, the plane of polarization of the light beams is rotated by the magnetic Kerr effect.

The light beam reflected by the disc 103, i.e. the reflected light from the disc 103, passes through the objective lens 5 and enters the PBS 101, is reflected through 90° by the reflecting surface 101a in the PBS 101 and is thereby split from the parallel light path 111. The reflected light split from the parallel light path 111 is again reflected through 90° by a reflecting surface 101b in the PBS 101 and directed into a Wollaston prism 7. Based on the light beam entering it, the Wollaston prism 7 produces three light beams: the original beam (hereinafter referred to as the i+j polarization component), an i polarization component, and a j polarization component, and discharges them toward a cylindrical lens 102.

The light beams discharged from the Wollaston prism 7 consist of parallel light, but this parallel light is converted by the cylindrical lens 102 into converging light. The converging light from the cylindrical lens 102 produces an astigmatism and is converged through a converging multilens 8 into a detector 9 of the kind shown in FIG. 3 having light receiving surfaces A through D, E, F, I and J.

In this case, where the reflected light corresponding to the main beam produced by the Wollaston prism 7, the i+j polarization component, the i polarization component, and the j polarization component are respectively converged onto the light receiving surfaces A through D of the central portion and the light receiving surfaces I and J shown in FIG. 3. Of the reflected light corresponding to one of the auxiliary beams produced by the Wollaston prism 7, the (i+j) polarization component, the i polarization component and the j polarization component are respectively converged onto the light receiving surface E and the portions to the left and right thereof where there are no light receiving surfaces. Of the reflected light corresponding to the other auxiliary beam, the (i+j) polarization component, the i polarization component and the j polarization component are respectively converged onto the light receiving surface F and the portions to the left and right thereof where there are no light receiving surfaces.

Voltages A through D, E, F, I and J corresponding to the amount of light received are outputted from the light receiving surfaces A through D, E, F, I respectively in the detector 9. In a processing circuit not shown in the drawings, $(iI_i^2 - jJ_i^2)$ is computed and an MO signal is obtained. Also, $\{(A+C)-(B+D)\}$ and (E-F) are computed and a focus error signal and a tracking signal are generated. A focus servo and a tracking servo are controlled to bring the focus error signal and the tracking error signal to 0. (I+J) is computed and output level control of the laser diode 1, etc, is carried out based on a pit signal obtained as a result of this computation.

In a magneto-optical disc reproduction device of the kind described above, because the beam splitter 101 is disposed in the light path of the parallel light 111 between the collimator lens 4 and the objective lens 5, the cylindrical lens 102 is necessary to make the parallel reflected light from the disc 103 into converging light. Consequently there has been the problem that the number of parts constituting the device is great and the light path to the detector 9 of the light beam emitted from the laser diode 1 is long and the device is large and expensive.

There have been devices (hereinafter referred to as divergent/convergent light optical system devices) wherein to avoid this problem the collimator lens 4 disposed between the Laser diode 1 and the grating 2 is disposed between the PBS 101 and the objective lens 5; in other words, the PBS 101 is disposed not in the parallel light path between the collimator lens 4 and the objective lens 5 but rather in the divergent/convergent light path (a divergent light path when seen from the laser diode 1 side and a convergent light path when seen from the disc 103 side) between the laser diode 1 and the collimator lens 4.

In this case, because the reflected light from the disc 103 which enters the PBS 101 is converging light, the cylindrical lens 102 can be dispensed with.

As the magneto-optical disc 103, there are those on which pregrooves are formed so that the tracks become wobbling tracks. Wobbling tracks are wavelike tracks having a predetermined frequency such as for example 22.05 kHz, formed a minute distance to the left and right of the center of the track proper; addresses on the disc 103 can be determined based on the phase of these wobbling tracks, and therefore there is no need to record addresses on the disc 103 and more information can be recorded.

When information recorded on such a magneto-optical disc 103 having wobbling tracks is to be reproduced by the divergent/convergent light optical system device discussed above, laser light shone onto the disc 103 is diffracted by the adjacent pregrooves and beams of diffracted light of the kind shown in FIG. 4 (the circular portions shown with broken lines in the drawing) are produced.

This diffracted light interferes with the reflected light from the track (the circular portion shown with solid lines in the drawing), and consequently a beam spot having areas of differing strengths is formed on the light receiving surfaces of the detector 9, as shown in FIG. 5.

This results in a tracking error signal fluctuating at the high frequency of 22.05 kHz being supplied to the servo circuit; however, the pickup servo system cannot follow up a tracking error signal of this high frequency, and as a result just follows up the average value of the tracking error signal fluctuating at 22.05 kHz. Consequently, even though the disc has wobbling tracks formed on it, tracking control is carried out so that the light beam is shone onto the center of the track proper (the center of the circular track which is not a wobbling track).

As a result, the position of the beam spot of the light beam on the disc 103 with wobbling tracks formed on it changes at 22.05 kHz, as shown in FIG. 6, as follows:

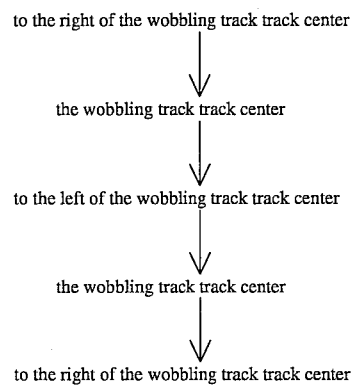

Accordingly, the influence of the diffraction caused by the pregrooves adjacent to the track also changes, and consequently a beam spot is formed on the light receiving surfaces of the detector 9, as shown in FIG. 7 whose strength distribution in the portions intersecting orthogonally with the track changes at a frequency of 22.05 kHz.

Here, when information is to be reproduced from the magneto-optical disc 103, because this is done based on the rotation direction of the plane of polarization, changes in the light strength of the beam spot formed on the light receiving surfaces of the detector 9 alone do not have any great affect on the reproduction of information from the magneto-optical disc 103.

On the other hand, the polarization characteristics of not just the PBS 101 but all PBSs are angle-dependent. That is, the reflected light reflected by the reflecting surface 101a of the PBS 101 and the transmitted light transmitted by the reflecting surface 101a are rotated according to the angle at which the light beam is incident on the reflecting surface 101a. Therefore, when the light beam is not parallel but rather is divergent or convergent, the plane of polarization of the beam spot formed on the detector 9 does not have the same direction over the whole beam spot.

Here, the fact that due to the angle-dependence of the PBS 101 the direction of the plane of polarization is not the same over the whole beam spot results in an error being included in the voltage outputted based on the direction of the plane of polarization. However, as long as the light strength and the direction of the plane of polarization of the beam spot do not change, this error voltage is of a constant value and can be measured in advance. Therefore, just the direction of the plane of polarization in the beam spot not being the same over the whole beam spot does not have any great affect on the reproduction of information from the magneto-optical disc 103.

However, when the magneto-optical disc 103 is a magneto-optical disc having wobbling tracks and is to be reproduced by a divergent/convergent light optical system device, a light beam of which the direction of the plane of polarization is not uniform and of which the light strength distribution changes at a frequency of 22.05 kHz due to interference enters the Wollaston prism 7.

Consequently, in this case, there is the problem that the voltage outputted from the detector 9 includes an error corresponding to the degree of the interference, in other words an error which changes with changes in the light strength of the beam spot, and it is not possible to obtain an accurate MO signal. Because of this it has been thought difficult to reproduce a magneto-optical disc 103 of which the tracks are wobbling tracks with a divergent/convergent light optical system device.

One conceivable method of solving this problem is to remove the wobbling track 22.05 kHz frequency component with a BPF (Band Pass Filter). However, signal components recorded on the magneto-optical disc 103 are included in the 22.05 kHz frequency band and it has been difficult to remove the wobbling track 22.05 kHz frequency component only.

SUMMARY OF THE INVENTION

It is, therefore, an object of the present invention to provide an optical pickup apparatus for a magneto-optical disc on which wobbling tracks are formed which resolves the above problem.

According to the present invention, there is provided an optical apparatus for a magneto-optical recording medium on which wobbling tracks are formed. The optical pickup apparatus includes a light beam generating unit, a converging optical system and a separating optical system. The light beam generating unit generates at least one light beam. The converging optical system converges the light beam generated by the light beam generating unit onto the magneto-optical recording medium and converges the reflected light beam reflected by the magneto-optical recording medium. The separating optical system is disposed in the divergent/convergent optical path between the light beam generating unit and the converging optical system and separates the reflected light beam from the divergent/convergent optical path. The light beam generating unit is disposed so that the direction of polarization of the light beam emitted thereby is normal to the tracks of the magneto-optical recording medium. The separating optical system is disposed so that the plane which includes the component of the reflected light beam from the magneto-optical recording medium corresponding to the component of the light beam emitted by the light generating unit which is on the optical axis and also includes the component of the light separated from the divergent/convergent light path which is said reflected light beam component separated from the divergent/convergent light path is normal to the track of the magneto-optical recording medium.

According to the present invention, there is provided a further optical pickup apparatus for a magneto-optical recording medium on which wobbling tracks are formed. This optical pickup apparatus includes a light source, an objective lens and a polarization beam splitter. The light source emits one beam of linearly polarized diverging light. The objective lens converges the light beam emitted by the light source onto the magneto-optical recording medium and converges the reflected light beam reflected by the magneto-optical optical recording medium. The polarization beam splitter is disposed in the divergent/convergent optical path between the light source and the objective lens and separates the reflected light beam from the divergent/convergent optical path. The light source is disposed so that the direction of polarization of the light beam emitted thereby is normal to the tracks of the magneto-optical recording medium. The polarization beam splitter is disposed so that the plane which includes the component of the reflected light beam from the magneto-optical recording medium corresponding to the component of the light beam emitted by the light source which is on the optical axis and also includes the component of the light separated from the divergent/convergent light path which is said reflected light beam component separated from the divergent/convergent light path is normal to the track of the magneto-optical recording medium.

According to the invention, because the separating optical system is disposed in the divergent/convergent light path between the light source and the converging optical system and the separating optical system is disposed so that the plane which includes the component of the reflected light beam from the magneto-optical recording medium corresponding to the component of the light beam emitted by the light generating unit which is on the optical axis and also includes the component of the light separated from the divergent/convergent light path which is said reflected light beam component separated from the divergent/convergent light path is normal to the track of the magneto-optical recording medium, the parts of the light beam reflected by the separating optical system of which the direction of the plane of polarization changes as a result of their being reflected in the separating optical system cease to be affected by interference caused by the wobbling tracks. Consequently it is possible to reproduce an accurate MO signal. Also, according to this invention, it is possible to realize reductions in the size and cost of the optical pickup.

BRIEF DESCRIPTION OF THE DRAWINGS

FIG. 3 is a view showing the constitution of the light receiving parts of a photodetector;

FIG. 9 is a view showing the constitution of an example of an optical pickup apparatus presented for comparison with an optical pickup apparatus according to a preferred embodiment of the invention;

FIG. 13 is a view showing diverging light incident on a reflecting surface R;

FIGS. 16(a) to 16(c) are views illustrating the effect of the angle-dependence of the polarization beam splitter in the optical pickup apparatus of FIG. 9;

DETAILED DESCRIPTION OF THE PREFERRED EMBODIMENTS

Figure 1:
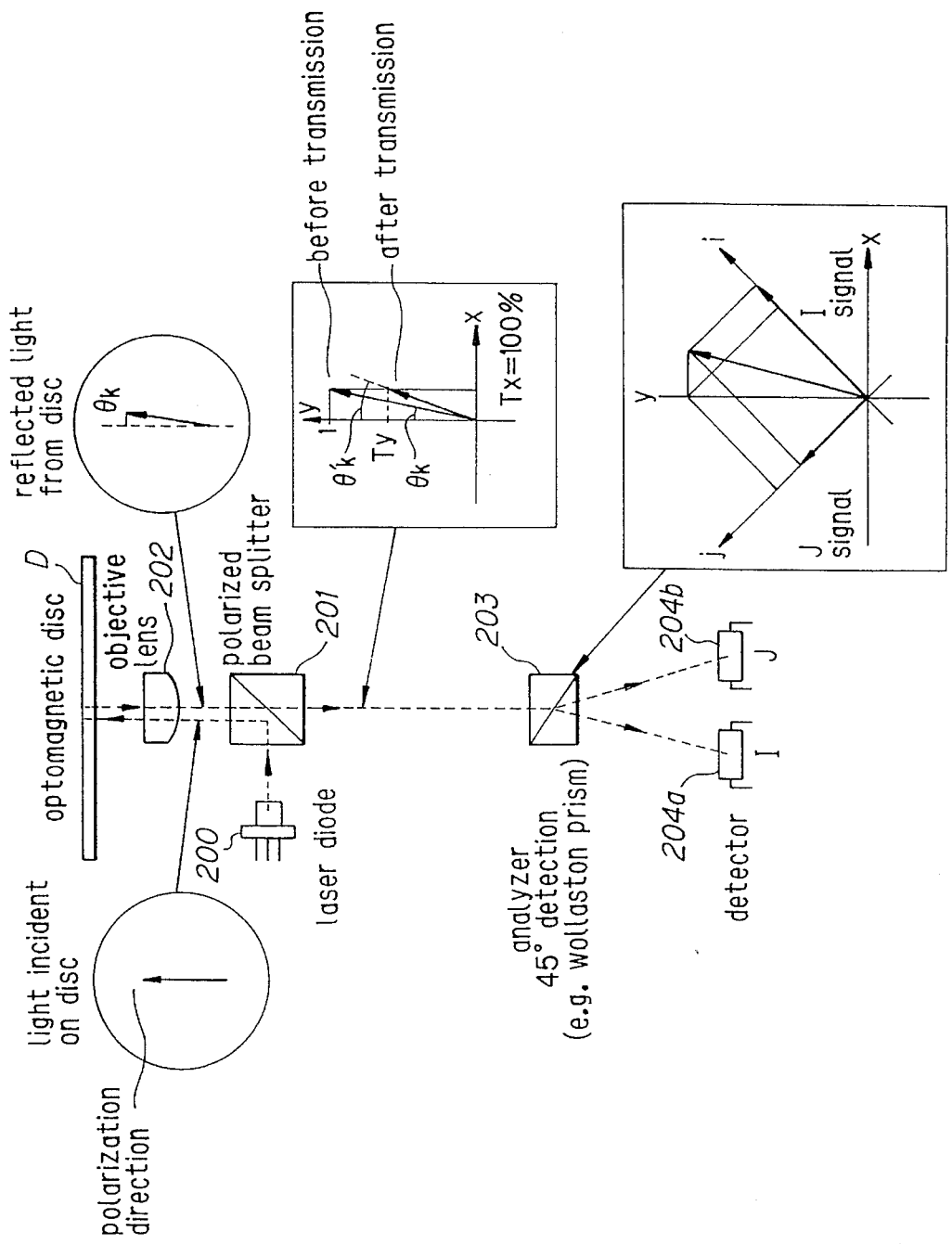
FIG. 1 is a view illustrating the reproduction principle of a magneto-optical disc.
Figure 2:
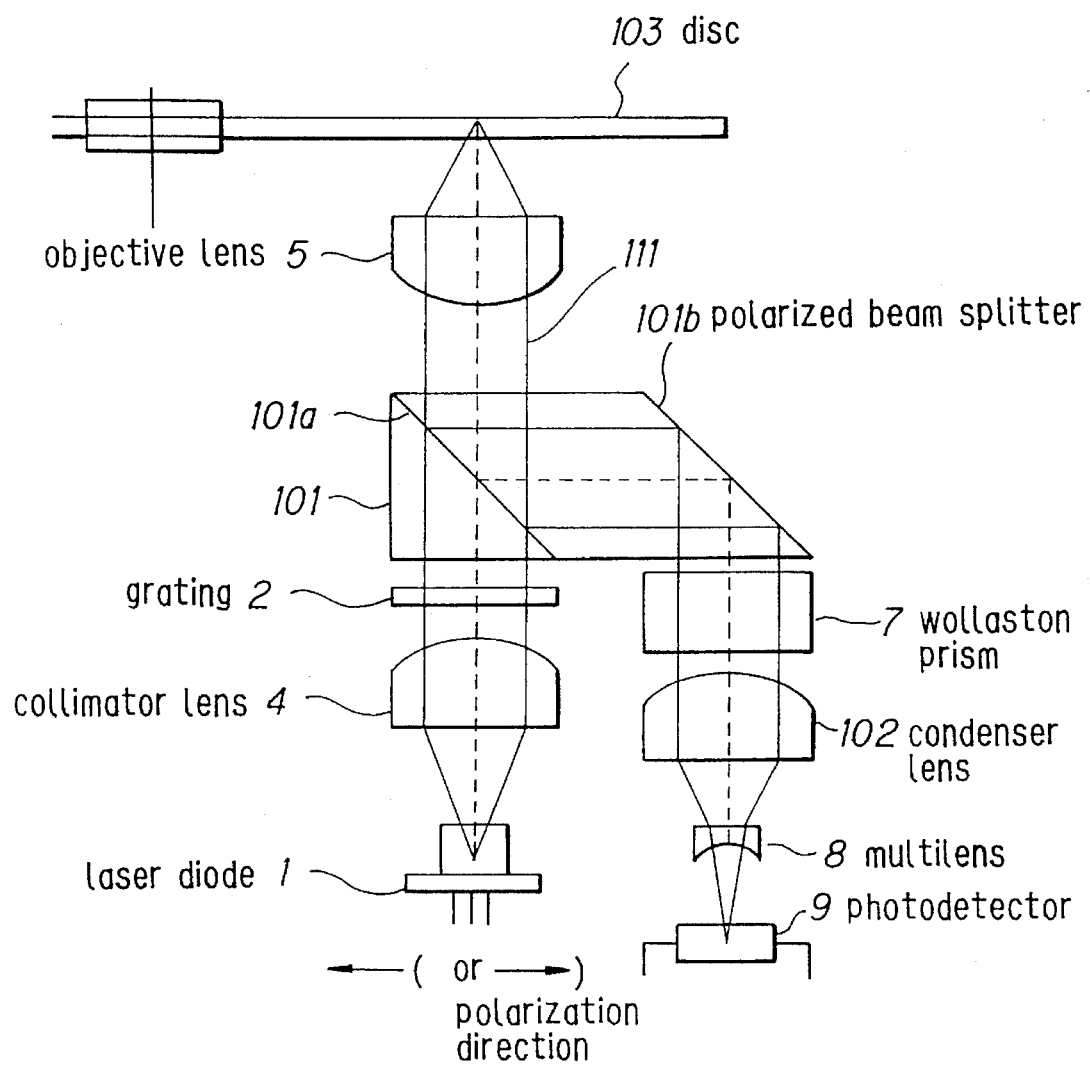
FIG. 2 is a view showing the constitution of an optical pickup for a magneto-optical recording medium.
Figure 4:
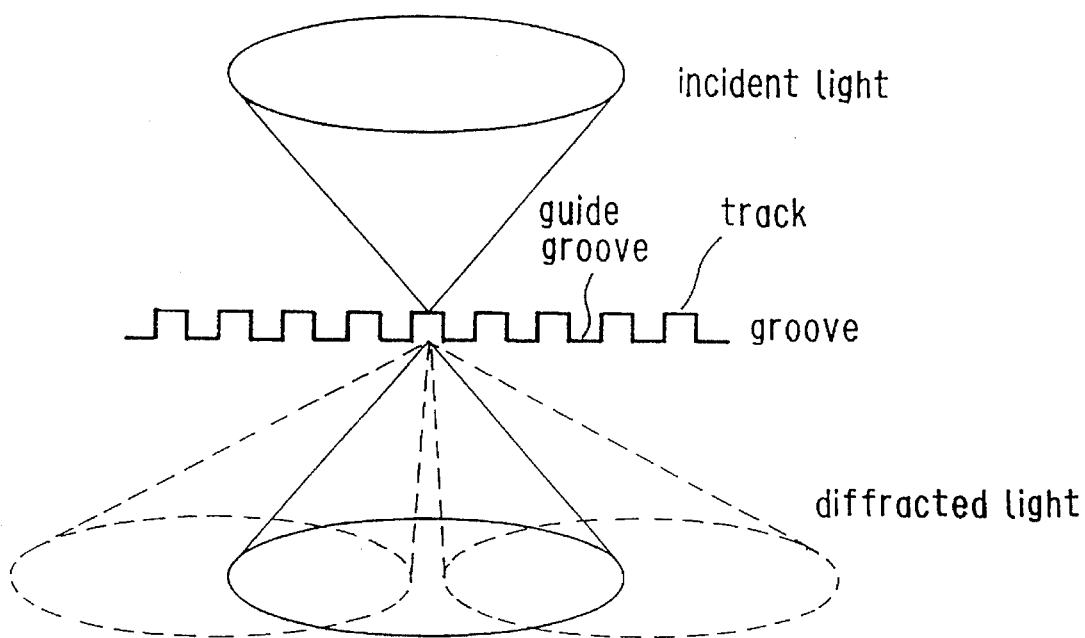
FIG. 4 is a view showing diffraction caused by a pregroove of a magneto-optical disc.
Figure 5:
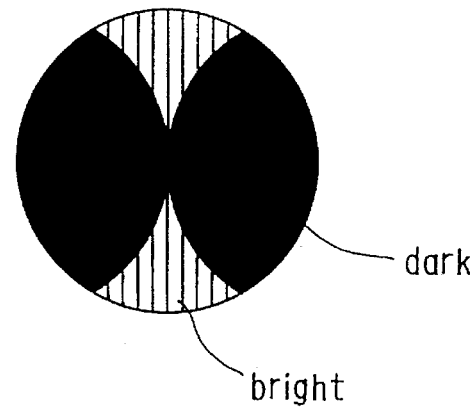
FIG. 5 is a view illustrating interference caused by diffracted light.
Figure 6:
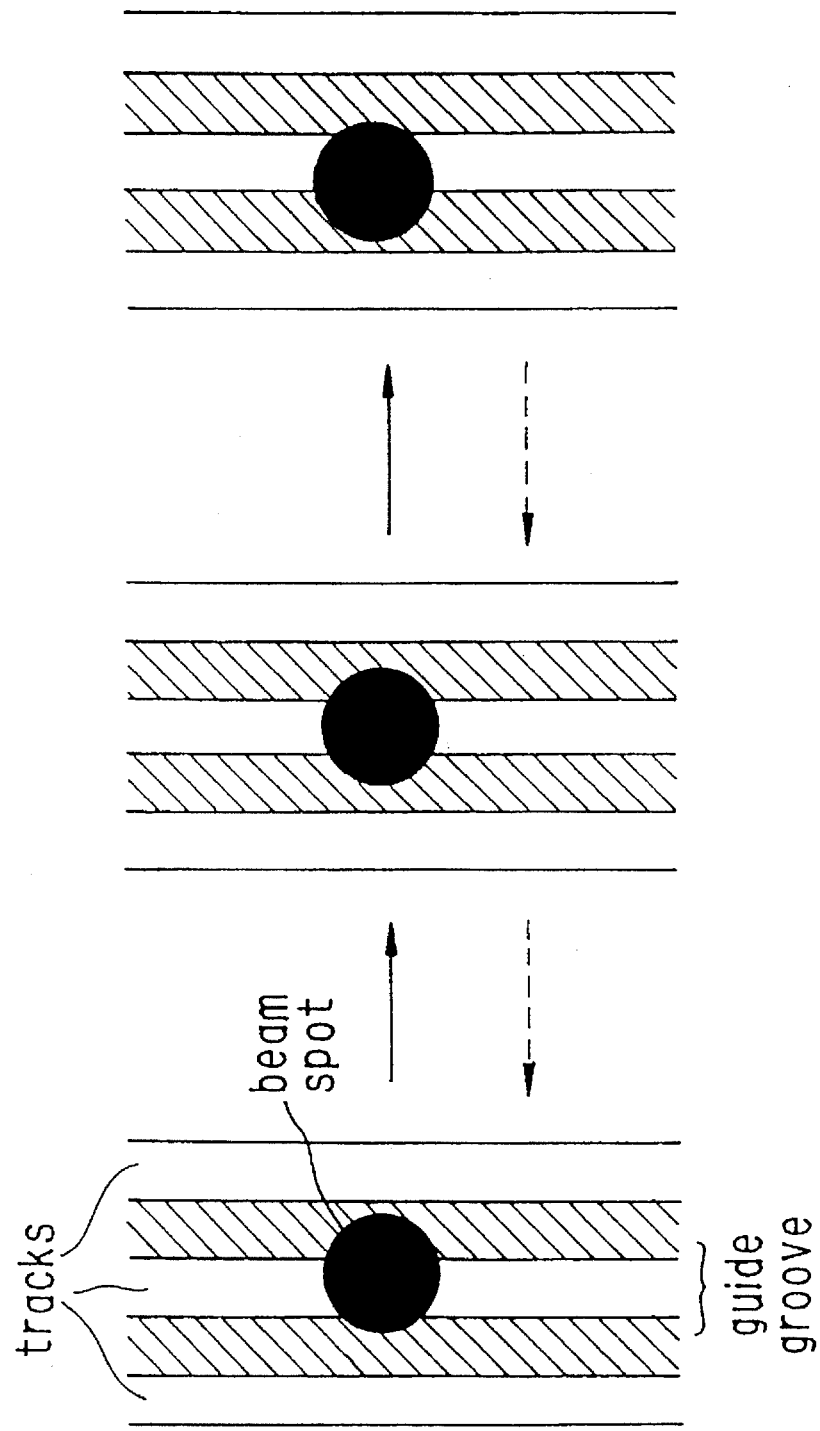
FIG. 6 is a view showing the positional relationship between a beam spot and a track during reproduction of a magneto-optical disc having a wobbling track.

An optical pickup apparatus according to the invention will be described in detail with reference to the accompanying drawings. First, an optical pickup apparatus comprising a polarization beam splitter (PBS) disposed in a divergent/convergent light path will be described. Parts which are the same as parts in FIG. 2 have been given the same reference numbers as their counterparts in FIG. 2 and their detailed description will be omitted.

Figure 8:
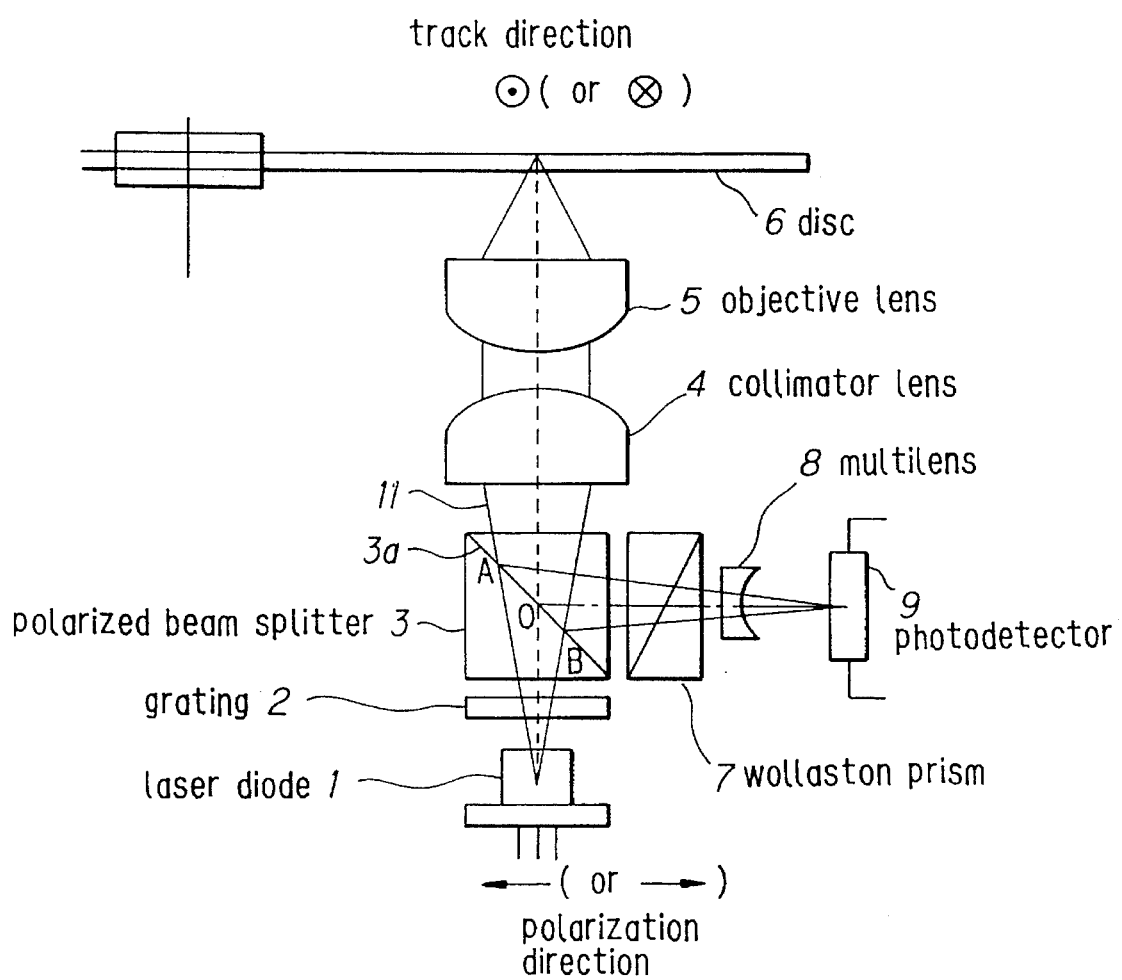
FIG. 8 is a view showing the constitution of an optical pickup apparatus according to a preferred embodiment of the invention.

FIG. 8 shows a sample construction of an optical pickup apparatus in which a PBS 3 is disposed in a divergent/convergent light path 11 between a laser diode 1, serving as a light source, and a collimator lens 4; FIG. 9 shows an example construction of an optical pickup in which a PBS 3 is disposed in a divergent/convergent light path 21 between a collimator lens 4 and a photodetector 9.

In FIG. 8, the light beam emitted by the laser diode 1 passes through a grating 2 into the PBS 3, is transmitted through the boundary plane 3a of the PBS 3, and enters the collimator lens 4. The collimator lens 4 turns the light beam from diverging light into parallel light and directs it into an objective lens 5. The parallel light from the collimator 4 is converged by the objective lens 5 onto a magneto-optical disc 6, or, more specifically, onto the recording surface of the magneto-optical disc 6.

Here, the disc 6 is provided with pregrooves so that its tracks are wobbling tracks.

The light beam which is converged onto the disc 6 is reflected thereby, passes through the objective lens 5 and reenters the collimator lens 4 where it is converted from parallel light into converging light. This now converging reflected light from the disc 6 is reflected, deflected through 90°, and discharged by the boundary plane 3a of the PBS 3. The reflected light beam then passes through a Wollaston prism 7 and a multilens 8 and is shone into a detector 9, and, as described below with reference to FIG. 3, an MO signal, a focus error signal, a tracking error signal and a pit signal are generated.

FIG. 9 is a view illustrating an example of an optical pickup apparatus for comparison with the optical pickup apparatus according to the preferred embodiment of the invention. In this device, the light beam emitted by the laser diode 1 passes through a grating 2 into a PBS 3 and is reflected, deflected through 90° and discharged into a collimator lens 4 by the boundary plane 3a of the PBS 3. The collimator lens 4 converts the light beam from a divergent beam into a parallel beam and directs it into an objective lens 5. The parallel light from the collimator lens 4 is converged by the objective lens 5 onto a disc 6.

The light beam converged onto the disc 6 is reflected by the disc 6, passes through the objective lens 5 and reenters the collimator 4 where it is converted from parallel light into converging light. This now converging reflected light from the disc 6 is transmitted through the PBS 3, passes through a Wollaston prism 7 and a multilens 8, is shone onto a detector 9, and, as described below with reference to FIG. 3, an MO signal, a focus error signal, a tracking error signal and a pit signal are generated.

Figure 10A:
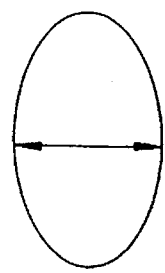
FIGS. 10(a) and 10(b) are views illustrating the relationship between the direction of polarization of a light beam emitted by a laser diode and the shape of a beam spot formed thereby.

Here it is known that, as shown in FIG. 10(a), the light beam emitted by the laser diode 1 is not circular in shape but rather is elliptical. It is also known that the direction of polarization of this kind of elliptical light beam is the same as the direction of the minor axis of the ellipse.

As mentioned above, this elliptical light beam is converged by the objective lens 5 onto the disc 6. Because in the objective lens 5 the broader portions of the elliptical laser light are contracted more than the less broad portions, the laser light of the elliptical shape shown in FIG. 10(a) forms a beam spot of the elliptical shape shown in FIG. 10(b) on the disc 6. Consequently the direction of polarization of the elliptical beam spot on the disc 6 is the direction of the major axis.

Figure 11A:
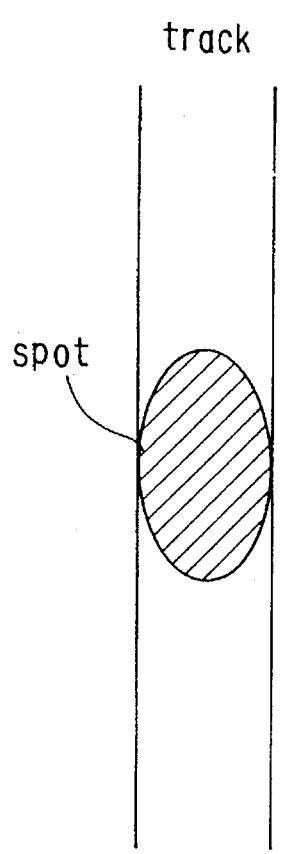
FIGS. 11(a) and 11(b) are views showing the relationship between the shape of a beam spot formed on a magneto-optical disc by a light beam emitted by a laser diode and the track of the disc.
Figure 11B:
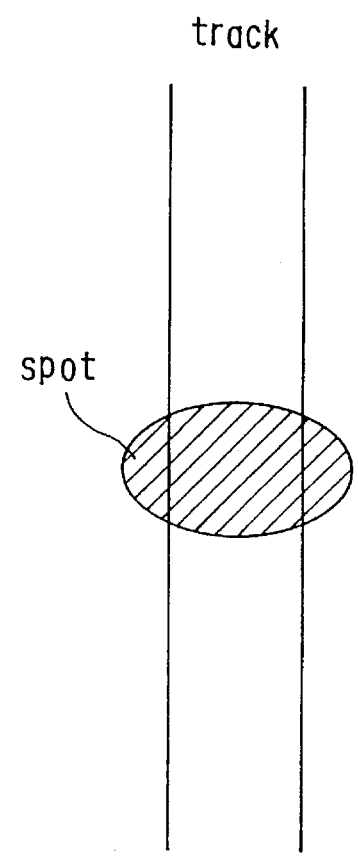

On the other hand it is known that the resolution in the track direction is higher if the major axis of the elliptical beam spot formed on the track of the disc 6 is orthogonal to the track, as shown in FIG. 11(b), than if it is parallel to the track, as shown in FIG. 11(a).

Figure 10B:
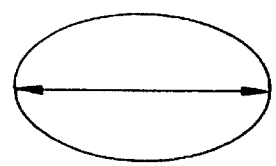

The major axis of the beam spot and the track direction being orthogonal in this way is, from that which was Illustrated in FIGS. 10(a) and 10(b), equivalent to the direction of polarization of the light beam and the track direction being orthogonal.

Therefore, in FIGS. 8 and 9, the laser diode 1 and the disc 6 are disposed so that the direction of polarization of the light beam and the track direction are orthogonal.

In the optical pickup apparatuses of the constructions shown in FIG. 8 and FIG. 9, the PBS 3 is disposed so that the direction of polarization of the light beam and the ideal plane of incidence of the PBS 3 are respectively parallel and perpendicular. For this reason they will respectively be called the P (meaning parallel) and S (meaning perpendicular) -split types.

Figure 12:
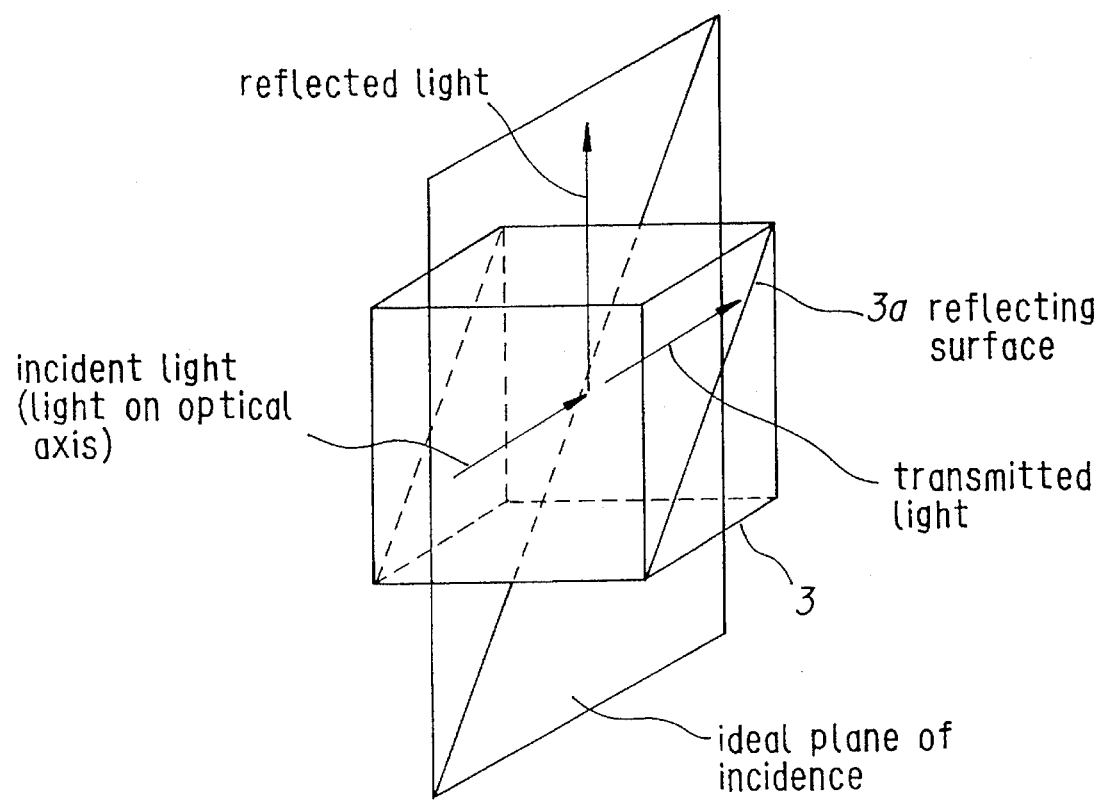
FIG. 12 is a view illustrating an ideal plane of incidence.

The ideal plane of incidence is defined as the plane which, as shown in FIG. 12, includes both the light on the optical axis and the reflected light which is the light on the optical axis reflected by the boundary plane 3a of the PBS 3. It should be noted that, hereinafter, when just 'the plane of incidence' is referred to it means the plane including light entering the PBS 3 and the reflected light which is the same light reflected by the boundary plane 3a.

Next, a reflecting surface R, like that shown in FIG. 13, which is normal to the yz plane and for example at an angle of 45° to the y and z axes and which also passes through the origin, and diverging light emitted by a light source in a position below the origin on the z axis, will be considered.

The diverging light will be supposed to have a direction of polarization parallel to the ideal plane of incidence, for example in the direction of the y axis, and the light on the z axis (the optical axis), the light diverging from the z axis in the direction of polarization (the y axis positive direction), the light diverging in the direction opposite to the direction of polarization (the y axis negative direction), the light diverging in the direction of the direction of polarization rotated clockwise through 90° (the x axis negative direction) and the light diverging in the direction of the direction of polarization rotated counterclockwise through 90° (the x axis positive direction) will be referred to respectively as the light beam O and the light beams A through D.

Accordingly, the light beams A, O, B (being the light in the ideal plane of incidence) are parallel to the ideal plane of incidence (the yz plane), and the light beams C, D are not parallel to the ideal plane of incidence (the yz plane).

The reflecting surface R will be supposed to transmit the P polarization component of an incident light beam, i.e. the component parallel to the plane of incidence, at the rate: transmittance Tp (generally about 65%), and reflect it at the rate: reflectance Rp (=1−Tp=35%), and transmit the S polarization component of an incident light beam, i.e. the component normal to the plane of incidence, at the rate: transmittance Ts (generally 100%), and reflect it at the rate: reflectance Rs (=1−Ts=0%).

Now, when diverging light whose optical axis is the z axis is incident on the reflecting surface R and is transmitted for example according to the transmittances Tp (=65%) and Ts (=100%) mentioned above, the P and S polarization components of the diverging light, being respectively the components parallel and normal to the plane of incidence, are obtained as transmitted light multiplied by 0.65 and 1 respectively. Other words transmitted light in which the S polarization component is unchanged and the P polarization component only has been multiplied by 0.65 (=Tp) is obtained.

Figure 14A:
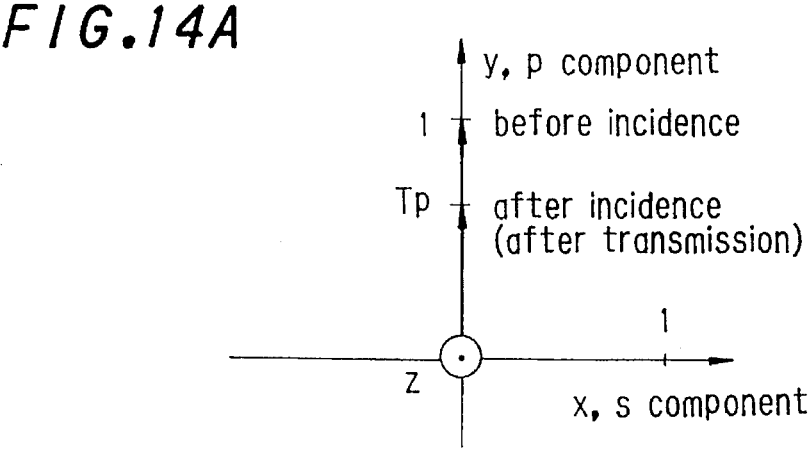
FIGS. 14(a) to 14(c) are views illustrating changes in the direction of polarization of the transmitted light when diverging light is transmitted through a boundary surface R.

Here, because the light beams A, O, B parallel to the ideal plane of incidence have their planes of incidence parallel to the direction of polarization of the diverging light (the y axis direction), as shown in FIG. 14(a) they have only a P polarization component, which is parallel to the plane of incidence. Consequently, in the case of the Light beams A, O, B, the S polarization component is unchanged and the P polarization component only is obtained as Tp-multiplied transmitted light. In other words, as shown in FIG. 14(a), Tp-multiplied transmitted light having the same direction of polarization as the original direction of polarization (the direction of polarization of the diverging light) is obtained.

Figure 14B:
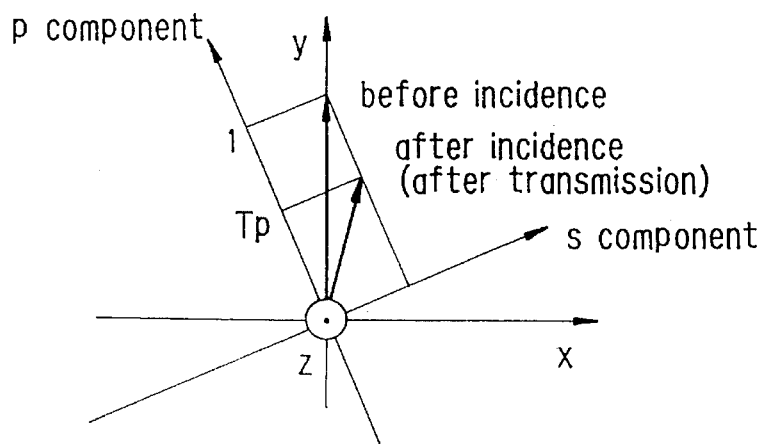

Because the plane of incidence of the light beam C, which is not parallel to the ideal plane of incidence, when seen from the z axis positive direction is angled to the left with respect to the direction of polarization of the diverging light, as shown in FIG. 14(b) the light beam C has a P polarization component parallel to its plane of incidence and an S polarization component normal thereto. Therefore, in the case of the light beam C, the S polarization component is unchanged and the P polarization component only is obtained as Tp-multiplied transmitted light whose direction of polarization, when seen from the z axis positive direction, has as shown in FIG. 14(b) been rotated to the right with respect to the original direction of polarization (the direction of polarization of the diverging light).

Figure 14C:
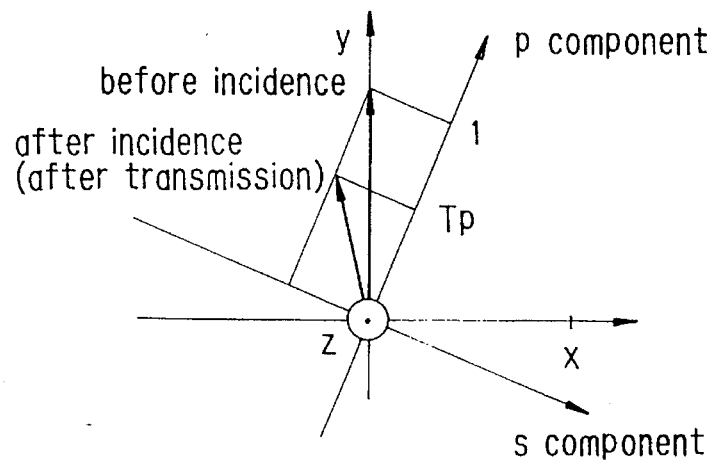

Also, because the plane of incidence of the light beam D, which is not parallel to the ideal plane of incidence, when seen from the z axis positive direction is angled to the right with respect to the direction of polarization of the diverging light, as shown in FIG. 14(c) the light beam D has a P polarization component parallel to its plane of incidence and an S polarization component normal thereto. Therefore, for the light beam D, the S polarization component is unchanged and the P polarization component only is obtained as Tp-multiplied transmitted light whose direction of polarization, when seen from the z axis positive direction, has as shown in FIG. 14(c) been rotated to the left with respect to the original direction of polarization (the direction of polarization of the diverging light).

From the above, when diverging light is transmitted through the reflecting surface R, in the case of light such as the light beams A, O, B whose direction of polarization is parallel to the ideal plane of incidence and whose plane of incidence is therefore parallel to the ideal plane of incidence, the direction of polarization of the transmitted light is no different from the direction before the light passed through the surface. However, in the case of light such as the light beams C and D, even though its direction of polarization is parallel to the ideal plane of incidence, in light whose plane of incidence is not parallel to the ideal plane of incidence the direction of polarization of the transmitted light is rotated to the left or to the right with respect to the direction before the light passed through the surface.

The above applies not only to light of which the direction of polarization is parallel to the ideal plane of incidence but also to light of which the direction of polarization is normal to the ideal plane of incidence.

Figure 15:
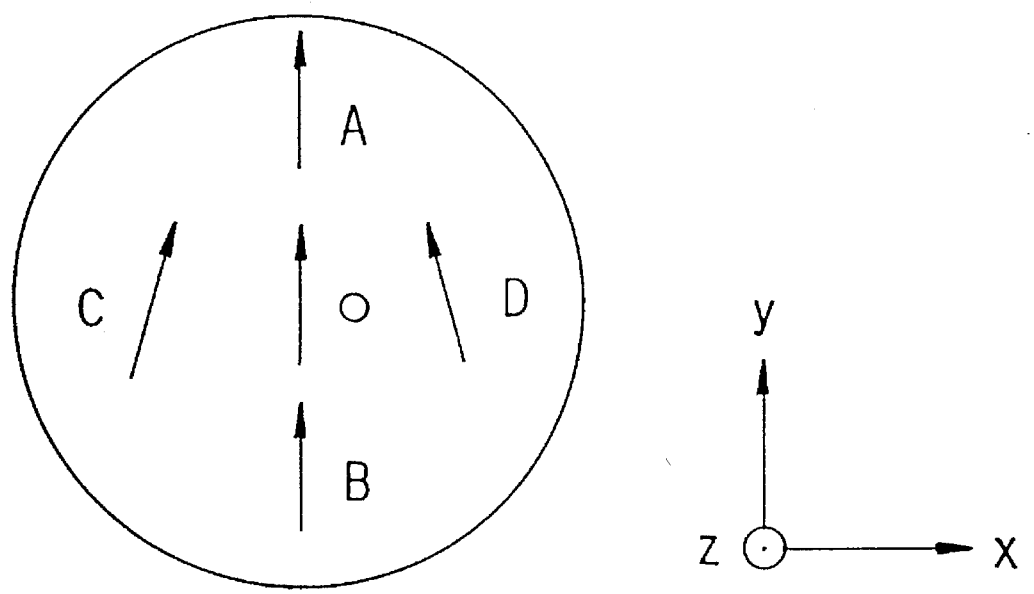
FIG. 15 is a view showing the direction of polarization of the transmitted light when diverging light is transmitted through a boundary surface R, as seen from the z-axis direction.

Therefore, in cases such as that shown in FIG. 13, when looking from the z axis positive direction at the transmitted diverging light, its directions of polarization are as shown in FIG. 15. That is, transmitted light which is the light beams C, D, whose planes of incidence are not parallel to the ideal plane of incidence, having had their directions of polarization rotated is obtained.

This applies not only when diverging light is transmitted by the reflecting surface R but also when it is reflected thereby.

Next, considering the optical pickup apparatuses shown in FIG. 8 and FIG. 9, because the direction of polarization of the light beam emitted as diverging light from the laser diode 1 is respectively parallel and normal to the ideal plane of incidence, this diverging light is reflected or transmitted by the reflecting surface 3. As a result there is no change in the direction of polarization of a light beam of which the plane of incidence is parallel to the ideal plane of incidence, but the direction of polarization of a light beam of which the plane of incidence is not parallel to the ideal plane of incidence rotates.

Now consider the light beam emitted as diverging light from the laser diode 1 as being, as shown in FIG. 13, made up of the light beam 0 on the optical axis, the light beams A, B (parallel to the ideal plane of incidence) included in the ideal plane of incidence and the light beams C, D (not parallel with the ideal plane of incidence) included in a plane orthogonal with the ideal plane of incidence. Due to the light beams being reflected by the boundary plane 3a of the PBS 3 in FIG. 9, due to the angle-dependence, discussed above, of the polarization characteristics of the PBS 3, in the beam spot formed on the disc 6, as shown in FIG. 16(b), the directions of polarization of the light beam C and the light D which are not parallel with the ideal plane of incidence are angled in mutually opposite directions.

Figure 7:
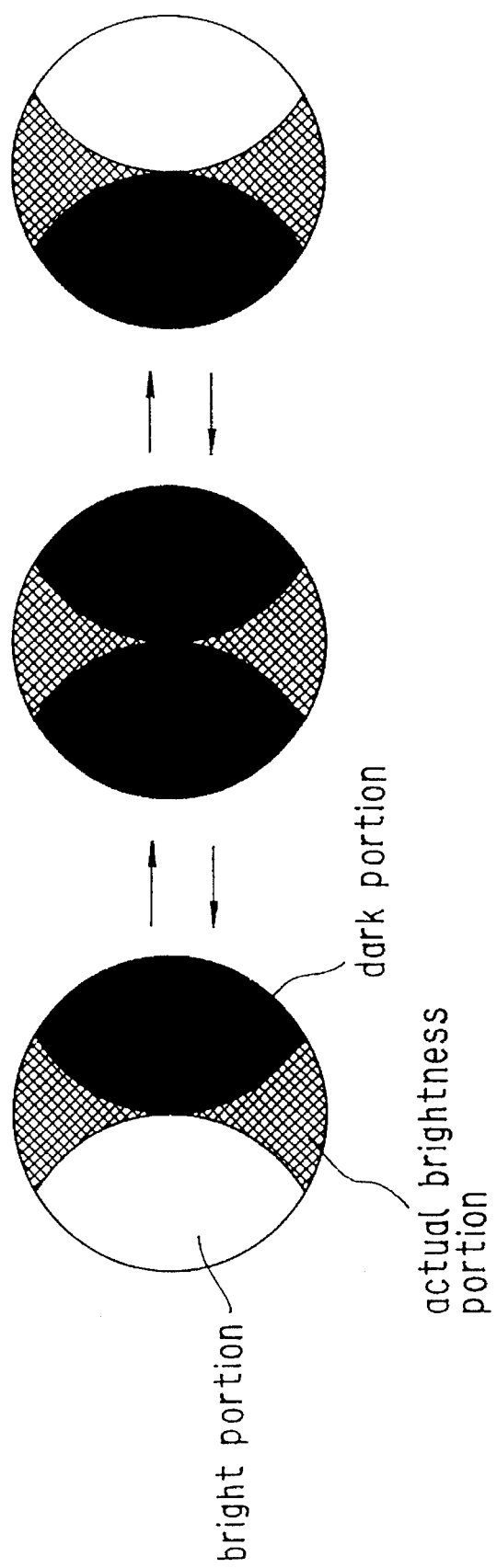
FIG. 7 is a view illustrating changes in the interference caused by diffracted light during reproduction of a magneto-optical disc having a wobbling track.

Also, in the optical pickup apparatus of FIG. 9, the light beams C and D are the part of the light beam diverging in the direction which intersects orthogonally with the track, and when the disc 6 with wobbling tracks formed on it is being reproduced the light strength of this light fluctuates at a frequency of 22.05 kHz, as was explained with reference to FIG. 7.

Consequently the light strength distribution in the detector 9 of the reflected light from the disc 6 changes: when as shown in FIG. 16(a) the portion corresponding to the light beam C becomes strong (bright) and the portion corresponding to the light beam B becomes weak (dark), the vector which expresses the polarization component of the light beam C becomes larger and the vector which expresses the polarization component of the light beam D becomes smaller, as shown in FIG. 16(c).

And, conversely, when the portion corresponding to the light beam C becomes weak (dark) and the portion corresponding to the light beam D becomes strong (bright), the vector which expresses the polarization component of the light beam C becomes smaller and the vector which expresses the polarization component of the light beam D becomes larger.

When the sizes of polarization components with different directions of polarization change in this way, the size and direction of the resultant vector of the polarization components of the light beams O and A through D change.

Because in the detector 9, as described above, an MO signal is generated based on the direction of polarization of the beam spot shown in FIG. 16(c), in other words based on the direction of the resultant vector of the polarization components of the light beams 0 and A through D, in the optical pickup apparatus shown in FIG. 9 the direction of this resultant vector changes at the frequency of the wobbling tracks of the disc 6 and as a result it is not possible to obtain an accurate MO signal.

Figure 17A:
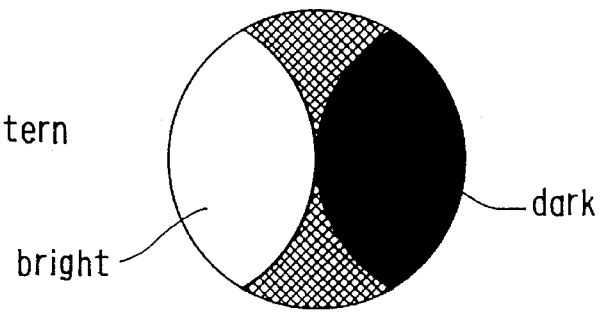
FIGS. 17(a) to 17(c) are views illustrating the affect of the angle-dependence of the polarization beam splitter in the optical pickup apparatus of FIG. 8.
Figure 17B:
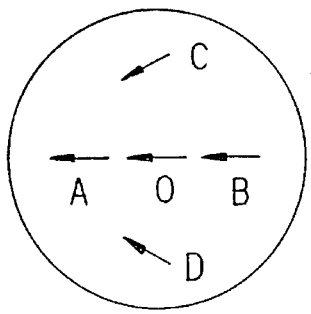

On the other hand, in the optical pickup apparatus of FIG. 8, due to the light beam passing through the boundary plane 3a of the PBS 3, based on the angle-dependence of the polarization characteristics of the PBS 3, in the beam spot formed on the disc 6, as shown in FIG. 17(b), the directions of polarization of the light beams C and D, which are not parallel with the ideal plane of incidence, are angled in mutually opposite directions.

In the optical pickup apparatus of FIG. 8, the light beams A and B are the part of the light beam diverging in the direction which intersects orthogonally with the track, and when the disc 6 with wobbling tracks formed on it is being played back, the light strength thereof fluctuates at a frequency of 22.05 kHz as was explained with reference to FIG. 7.

Figure 17C:
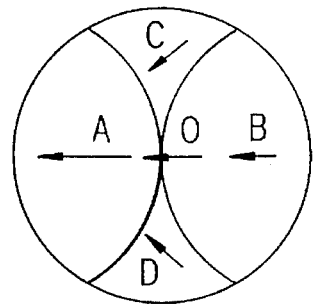

Consequently, in the detector 9, the light strength distribution of the reflected light from the disc 6 changes: when as shown in FIG. 17(a) the portion corresponding to the light beam A becomes strong (bright) and the portion corresponding to the light beam B becomes weak (dark), the vector which expresses the polarization component of the light beam A becomes larger and the vector which expresses the polarization component of the light beam B becomes smaller, as shown in FIG. 17(c).

And, conversely, when the portion corresponding to the light beam A becomes weak (dark) and the portion corresponding to the light beam B becomes strong (bright), the vector which expresses the polarization component of the light beam A becomes smaller and the vector which expresses the polarization component of the light beam B becomes larger.

However, in this case, because it is the sizes of polarization components of which the directions of polarization are the same that are changing, in a so-called complementary way, neither the size nor the direction of the resultant vector of the light beams O and A through D changes.

In other words, in the optical pickup apparatus shown in FIG. 8, it is possible to obtain an accurate MO signal.

From the above, disposing the PBS 3 in a divergent/convergent light path, in order to get an accurate MO signal from the disc 6 with wobbling tracks formed on it, all that is necessary is to arrange for the light which is not parallel with the ideal plane of incidence, and whose direction of polarization therefore changes due to the angle-dependence of the PBS 3, to be shone on the portion in the track direction, or in other words to make the ideal plane of incidence normal to the track.

As explained with reference to FIGS. 10(a) and 10(b), 11(a) and 11(b), it is desirable that the direction of polarization of the light beam from the laser diode 1 be normal to the track; however, in the optical pickup apparatus of FIG. 9, because the direction of polarization of the light beam from the laser diode 1 is also normal to the ideal plane of incidence of the PBS 3, it is not possible to adopt a construction wherein the ideal plane of incidence is normal to the track.

In the optical pickup apparatus of FIG. 8, on the other hand, because the direction of polarization of the light beam from the laser diode 1 is parallel to the ideal plane of incidence, it is possible to adopt a construction wherein the ideal plane of incidence is normal to the track.

From the above, disposing the PBS 3 in the divergent/convergent light path, in order to obtain an accurate MO signal from the disc 6 with wobbling tracks formed on it, it is necessary to use the P-split type of optical pickup apparatus shown in FIG. 8.

Figure 18:
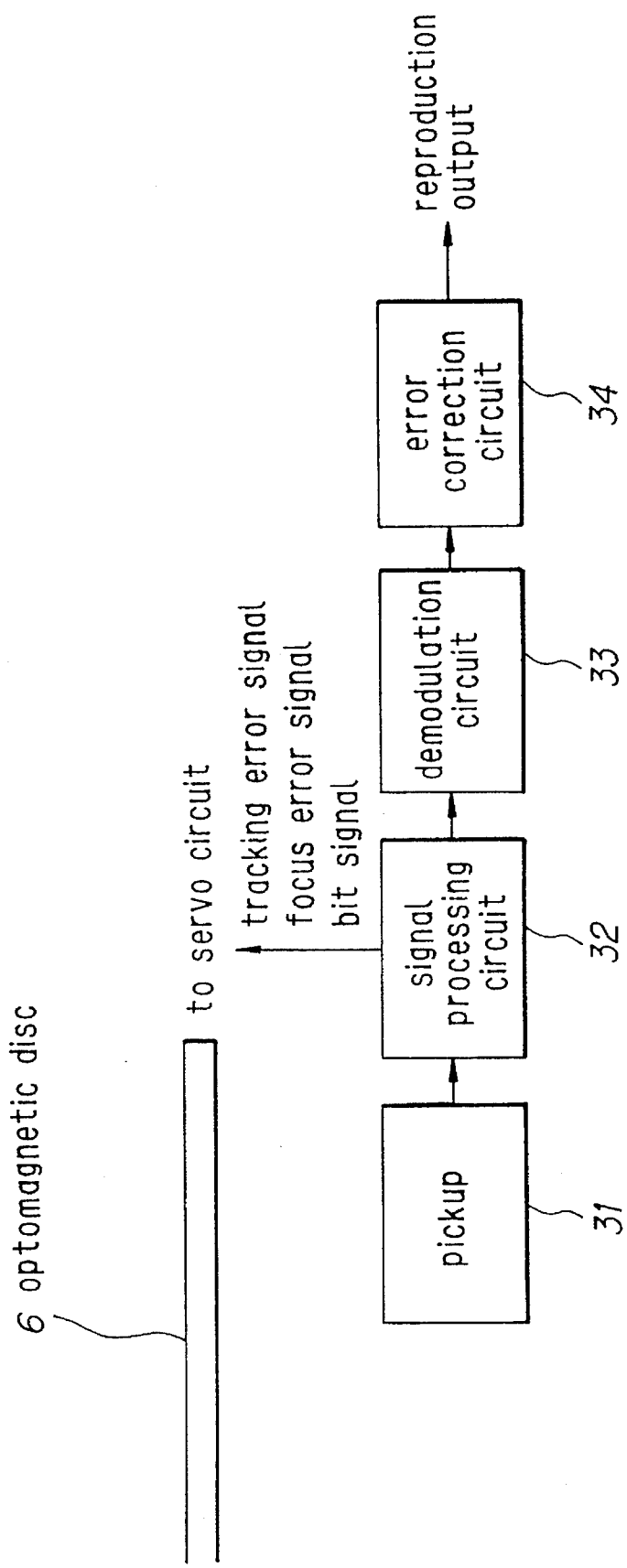
FIG. 18 is a block diagram showing the constitution of a magneto-optical disc reproduction unit to which an optical pickup apparatus according to the first preferred embodiment of the invention has been applied.

FIG. 18 is a block diagram showing the structure of an embodiment of a magneto-optical disc reproduction unit to which the optical pickup apparatus of the invention has been applied. A pickup 31 is a P-split type pickup which shines a light beam onto a magneto-optical disc 6 with wobbling tracks formed on it and receives the reflected light on the light receiving surfaces, arranged as shown in FIG. 3, of a detector 9. At these light receiving surfaces the received light is optoelectrically converted into a voltage signal corresponding to the quantity of light received and is outputted to a signal processing circuit 32.

The signal processing circuit 32 carries out computations of the kind discussed above on the signals from the light receiving surfaces of the detector 9 in the pickup 31 and generates a focus error signal, a tracking error signal, a pit signal and an MO signal. The focus error signal, the tracking error signal and the pit signal are supplied to a servo circuit not shown in the drawings and servo control based on these signals is carried out by this servo circuit.

The MO signal is supplied to a demodulating circuit 33, demodulated there and outputted to an error correction circuit 34. The error correction circuit 34 performs error correction processing on the demodulated output of the demodulating circuit 33 and outputs it as a reproduction signal.

As described above, because the device comprises a pickup disposed in the divergent/convergent light path 11, it is possible to reduce the size and cost of the device.

Also, in this case, because the PBS 3 is disposed so that its ideal plane of incidence is normal to the direction of the tracks of the disc 6 with wobbling tracks formed on it, an MO signal unaffected by any errors due to the wobbling tracks can be obtained.

In the above, a case in which the invention is applied to a magneto-optical disc device was described; however, besides magneto-optical disc devices this invention can be applied for example to devices which reproduce card or tape form recording media on which information is magneto-optically recorded and which have wobbling tracks.

What is claimed is:

1. An optical pickup apparatus for a magneto-optical recording medium on which wobbling tracks are formed, the apparatus comprising:

light beam generating means for generating along an optical axis a light beam, having direction of polarization;

a light-converging optical system for converging the light beam generated by the light beam generating means onto the magneto-optical recording medium and converging a reflected light beam from the magneto-optical recording medium; and a separating optical system, disposed in a divergent/convergent light path between the light beam generating means and the light-converging optical system, for reflecting the reflected light beam from the magneto-optical recording medium and separating it from the divergent/convergent light path, wherein the light beam generating means is disposed so that the direction of polarization of the light beam generated thereby is normal to a track of the magneto-optical recording medium, and the separating optical system is disposed so that a plane which includes a component of the reflected light beam from the magneto-optical recording medium corresponding to a component of the light beam generated by the light beam generating means also includes a component of light separated from the divergent/convergent light path, which is said reflected light beam component, which is normal to a track of the magneto-optical recording medium.

2. An optical pickup apparatus according to claim 1, wherein the apparatus further comprises:

a diffraction grating disposed between the light beam generating means and the separating optical system, and based on the light beam generated by the light beam generating means the diffraction grating produces light beams including at least a first light beam on the optical axis and second and third light beams located on either side of a light beam spot formed by the first light beam on a track of the magneto-optical recording medium.

3. An optical pickup apparatus according to claim 2, wherein the apparatus further comprises:

light detecting means for receiving the reflected light beam reflected from the magneto-optical recording medium and separated by the separating optical system and a Wollaston prism disposed between the separating optical system and the light detecting means, the Wollaston prism producing at least three light beams from each of the first, second and third light beams.

4. An optical pickup apparatus according to claim 1, wherein the separating optical system is a polarization beam splitter.

5. An optical pickup apparatus according to claim 4, wherein the polarization beam splitter is disposed so that the plane which includes the component of the reflected light beam from the magneto-optical recording medium corresponding to the component of the light beam generated by the light beam generating means which is on the optical axis and also includes the component of the light separated from the divergent/convergent light path which is said reflected light beam component separated from the divergent/convergent light path is parallel to a plane of polarization of the light beam generated by the light beam generating means.

6. An optical pickup apparatus for a magneto-optical recording medium on which wobbling tracks are formed, the apparatus comprising:

a light source for emitting a linearly polarized diverging light beam;

an objective lens for converging the light beam emitted by the light source onto the magneto-optical recording medium and converging a reflected light beam from the magneto-optical recording medium; and a polarization beam splitter, disposed in a divergent/convergent light path between the light source and the objective lens, for reflecting the reflected light beam from the magneto-optical recording medium and separating it from the divergent/convergent light path, wherein the light source is disposed so that a plane of polarization of the light beam emitted by the light source is normal to a track of the magneto-optical recording medium, and the polarization beam splitter is disposed so that a plane which includes a component of the reflected light beam from the magneto-optical recording medium corresponding to a component of the light beam emitted by the light source which is on an optical axis and also includes a component of light separated from the divergent/convergent light path which is said reflected light beam component separated from the divergent/convergent light path is normal to a track of the magneto-optical recording medium.

7. An optical pickup apparatus according to claim 6, wherein the polarization beam splitter is disposed so that the plane which includes the component of the reflected light beam from the magneto-optical recording medium corresponding to the light beam emitted by the light source which is on the optical axis and also includes the component of the reflected light beam separated from the divergent/convergent light path is parallel to the plane of polarization of the light beam emitted by the light source.

8. An optical pickup apparatus according to claim 6, wherein said apparatus further comprises:

a diffraction grating disposed between the light source and the polarization beam splitter and based on the light beam emitted by the light source the diffraction grating produces light beams including at least a first light beam which is on the optical axis and second and third light beams located on either side of a light beam spot formed by the first light beam on a track of the magneto-optical recording medium.

9. An optical pickup method using a magneto-optical recording medium on which wobbling tracks are formed, the method comprising the steps of:

generating along an optical axis a light beam having a direction of polarization;

converging said light beam onto the magneto-optical recording medium and converging a reflected light beam from the magneto-optical recording medium; and reflecting a component of said reflected light beam from the magneto-optical recording medium and separating it from a divergent/convergent light path, wherein the direction of polarization of a component of said light beam is normal to a track of the magneto-optical recording medium, and a plane which includes a component of said reflected light beam from the magneto-optical recording medium corresponding to a component of said light beam which is on the optical axis and also includes the component of said reflected light beam separated from the divergent/convergent light path is normal to the track of the magneto-optical recording medium.

10. The optical pickup method of claim 9, further comprising the step of:

diffracting said light beam into multiple light beams including at least a first light beam on the optical axis and second and third light beams located on either side of a light beam spot formed by the first light beam on a track of the magneto-optical recording medium.

11. An optical pickup method according to claim 10, wherein the step of reflecting a component of said reflected light beam from the magneto-optical recording medium and separating it from a divergent/convergent light path further comprises the step of detecting said reflected light beam reflected from the magneto-optical recording medium and separated by a separating optical system and a Wollaston prism which produces at least three light beams from each of the first, second and third light beams.

12. The optical pickup method of claim 9, wherein the step of reflecting a component of said reflected light beam from the magneto-optical recording medium and separating it from a divergent/convergent light path comprises the step of:

using a polarization beam splitter.

13. An optical pickup method according to claim 9, wherein the step of reflecting a component of said reflected light beam from the magneto-optical recording medium and separating it from a divergent/convergent light path further comprises the step of causing the plane which includes a component of said reflected light beam from the magneto-optical recording medium corresponding to the component of said light beam which is on the optical axis and also includes the component of said reflected light beam separated from the divergent/convergent light path to be parallel to a plane of polarization of said light beam.

14. An optical pickup method using a magneto-optical recording medium on which wobbling tracks are formed, the method comprising the steps of:

emitting a linearly polarized diverging light beam along an optical axis;

converging the light beam onto the magneto-optical recording medium and converging a reflected light beam from the magneto-optical recording medium; and reflecting a component of said reflected light beam from the magneto-optical recording medium and separating it from a divergent/convergent light path, wherein a plane of polarization of said linearly polarized diverging light beam is normal to a track of the magneto-optical recording medium, and a plane which includes the component of said reflected light beam from the magneto-optical recording medium corresponding to said linearly polarized diverging light beam and also includes the component of said reflected light beam separated from the divergent/convergent light path is normal to a track of the magneto-optical recording medium.

15. An optical pickup method according to claim 14, wherein the step of reflecting at least one component of said reflected light beam from the magneto-optical recording medium and separating it from a divergent/convergent light path further comprises the step of causing the plane which includes the component of said reflected light beam from the magneto-optical recording medium corresponding to said linearly polarized diverging light beam and also includes the component of said reflected light beam separated from the divergent/convergent light path to be parallel to the plane of polarization of said linearly polarized diverging light beam.

16. The optical pickup method of claim 14, further comprising the step of:

diffracting said light beam into multiple light beams including at least a first light beam on the optical axis and second and third light beams located on either side of a light beam spot formed by the first light beam on a track of the magneto-optical recording medium.

* * * * *